United States Patent [19]
Murdoch

[11] 4,074,922
[45] * Feb. 21, 1978

[54] DRILL BIT

[75] Inventor: Henry W. Murdoch, Houston, Tex.

[73] Assignee: Reed Tool Company, Houston, Tex.

[*] Notice: The portion of the term of this patent subsequent to Nov. 9, 1993, has been disclaimed.

[21] Appl. No.: 695,505

[22] Filed: June 11, 1976

Related U.S. Application Data

[63] Continuation-in-part of Ser. No. 604,264, Aug. 13, 1975, Pat. No. 3,990,751.

[51] Int. Cl.² .............................................. F16C 19/00
[52] U.S. Cl. ..................................... 308/8.2; 308/241
[58] Field of Search ................... 308/8.2, 237 R, 241, 308/240

[56] References Cited

U.S. PATENT DOCUMENTS 3,990,751  11/1976  Murdoch ............................. 308/8.2

Primary Examiner—Philip Goodman
Assistant Examiner—Gene A. Church
Attorney, Agent, or Firm—Neal J. Mosely

[57] ABSTRACT

A roller cutter drill bit comprises a body having a journal, a roller cutter, bearing means for rotatively mounting a roller cutter on the journal and a part of said bearing means including a hard, tough metal bushing with a lubricant metal coated thereon, and positioned between the sleeve and the journal and between the sleeve and the roller cutter to prevent galling.

10 Claims, 1 Drawing Figure

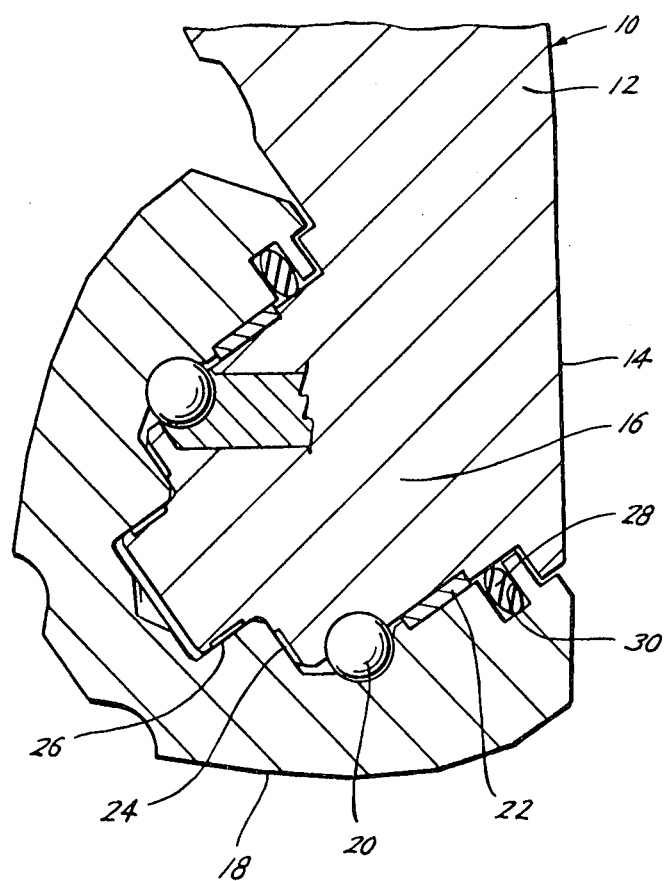

DRILL BIT

CROSS-REFERENCE TO RELATED APPLICATION

This application is a continuation-in-part of the copending application of Henry W. Murdoch, Ser. No. 604,264, filed Aug. 13, 1975, now U.S. Pat. No. 3,990,751.

BACKGROUND OF THE INVENTION

The drilling industry has devoted considerable effort to the improvement of bearings for roller cutter drill bits. To have a sufficiently long drilling life to be commercially useful, the bearings should have a minimum of friction and wear. Many hard, tough bearing metals have the disadvantage that they tend to gall badly.

SUMMARY OF THE INVENTION

The present invention provides an improved roller cutter drill bit bearing of a hard, tough metal having sufficient lubricity that the tendency toward galling is overcome.

An object of the present invention is to provide an improved roller cutter drill bit having a bearing means with a long life.

A further object is to provide an improved roller cutter drill bit having a bearing of hard tough metal which is not subject to galling.

BRIEF DESCRIPTION OF THE DRAWING

The FIGURE is a sectional view of a portion of a drill bit embodying the improved structure of the present invention.

DESCRIPTION OF THE PREFERRED EMBODIMENTS

The drill bit 10 shown in the FIGURE includes the body 12 having at least one leg 14 extending therefrom. The leg 14 terminates in the journal 16 about which the roller cutter 18 is rotatively mounted by suitable bearing means. The bearing means includes the ball bearings 20, the sleeve bearing 22 and the bearing surfaces 24 and 26. The seal 28 is positioned in the groove 30 in roller cutter 18. The seal 28 functions as the outer seal for the lubricant system (not shown) which supplies lubricant to the bearings.

Sleeve bearing 22 is of a floating sleeve type of bearing or bushing. The sleeve bearing 22 is made of a hard tough metal which has a Rockwell C hardness of at least 35 and is treated to provide a lubricated surface which mitigates or substantially eliminates the tendency toward galling. The metal of the bearing should be hard and tough to resist the high wear encountered in a drill bit. The bearing may be of a beryllium-copper alloy such as an alloy of copper containing 0.25–3.0% beryllium, preferably about 1.80–2.05%. The alloy may contain lesser amounts of cobalt, nickel and iron, e.g. 0.20–0.30% cobalt or a mixture of cobalt and nickel of at least 0.2% or a mixture of cobalt, nickel and iron not exceeding 0.6%. An alloy of this type may have a modulus of elasticity of 18,500,000 and may be solution annealed and age hardened to a tensile strength of 165,000 to 190,000 PSI having a Rockwell C hardness of 36 to 41.

Alternatively, the bearing 22 may be of a maraging steel alloy which has been treated to a maximum of hardness which is preferably of about Rockwell C 50 to 55. Other hard tough alloys may be used and the properties required are a combination of strength, hardness and toughness. The metal should have a high tensile strength accompanied by considerable toughness and a Rockwell C hardness in excess of 35.

In order to prevent galling, the sleeve bearing 22 is coated, as by plating or by various metalizing techniques, with a soft lubricant metal such as lead, indium, tin, copper or silver. A silver plating or other silver coating is the preferred lubricant for the bearing 22 and is coated on the exterior and interior to a reasonable thickness, such as one mil. Also multiple coatings may be used, e.g. lead over silver, indium over lead over silver, tin over silver, etc.

The bit may also be provided with supplemental lubrication consisting of fine particles of a lubricating metal such as copper or silver suspended in the grease which is loaded into the lubrication system. In this manner, the particles are initially all around the bearing sleeve 22 and during operation the particles provide additional lubricity which assists in avoiding the galling problems encoutered with most hard tough metal bearings.

In a bit constructed as described above, the bearing sleeve is resistent to extrusion under heavy loads and the sleeve functions better as a bearing because it has greater hardness and toughness. The coating or plating of silver or copper or other soft lubricant metal on the bearing sleeve provides a greater resistance to galling since the metal coating may transfer back and forth between the bearing and the surface contacted by the bearing under conditions of use. The metal coating on the bearing transfers freely between the contact surfaces and prevents galling.

From the foregoing, it could be seen that the present invention provides an improved drill bit with a sleeve bearing having greater toughness, hardness and temperature resistance than prior sleeve bearings and as a result of the lubricant coating is not subject to appreciable galling.

I claim:

1. A drill bit, comprising
a body having a journal extending therefrom,
a roller cutter,
bearing means for rotatively mounting said roller cutter on said journal,
at least part of said bearing means including
a hard tough metal sleeve having a Rockwell C hardness of at least 35 positioned around said journal within said roller cutter, and
a metal coating on said sleeve having lubricating properties positioned between said sleeve and said journal and between said sleeve and said roller cutter,
said metal coating imparting sufficient lubricity to said sleeve to prevent galling of said roller cutter and said journal.

2. A drill bit according to claim 1 wherein said metal coating is plated on said sleeve.

3. A drill bit according to claim 1 wherein said metal coating is applied to said sleeve by metalizing.

4. A drill bit according to claim 1 wherein said metal coating comprises a plurality of layers of lubricating metal.

5. A drill bit according to claim 1 wherein said metal coating is at least one layer of silver, copper, tin, lead or indium.

6. A drill bit according to claim 1 wherein said metal coating includes at least one additional layer of metal coating, wherein said additional layer is of copper, silver, tin, lead or indium.

7. A drill bit according to claim 1 wherein said sleeve is of beryllium-copper alloy or a maraging steel alloy heat-treated to considerable hardness.

8. A drill bit according to claim 1 wherein there is provided between said sleeve, said journal, and said cutter, supplemental lubricating material comprising a grease containing metallic particles wherein said particles consist of indium, tin, lead, silver or copper.

9. A drill bit according to claim 1, including a lubrication system within said body and in communication with said bearing means, a lubricant grease having metallic particles dispersed therein wherein said metallic particles consist of silver or copper, and said lubricant grease being added to said lubrication system whereby the grease and particles are delivered to the areas of contact on said sleeve with said journal and said roller cutter.

10. A drill bit according to claim 9 wherein said metal coating is silver.